United States Patent [19]
Ban et al.

[11] Patent Number: 5,829,676
[45] Date of Patent: Nov. 3, 1998

[54] HEATING APPARATUS AND METHOD FOR VEHICLE

[75] Inventors: Takashi Ban; Shigeru Suzuki; Nobuaki Hoshino, all of Kariya, Japan

[73] Assignee: Kabushiki Kaisha Toyoda Jidoshokki Seisakusho, Kariya, Japan

[21] Appl. No.: 970,144

[22] Filed: Nov. 12, 1997

[30] Foreign Application Priority Data

Nov. 11, 1996 [JP] Japan .................................. 8-298619

[51] Int. Cl.⁶ ................................................ B60H 1/02
[52] U.S. Cl. ............................ 237/12.3 R; 237/12.3 B; 123/41.15; 126/247
[58] Field of Search ........................ 237/12.3 B, 12.3 R; 126/247; 122/26; 123/41.15

*Primary Examiner*—Henry A. Bennett
*Assistant Examiner*—Derek S. Boles
*Attorney, Agent, or Firm*—Brooks Haidt Haffner & Delahunty

[57] ABSTRACT

A heating method and apparatus for vehicles. A viscous fluid type heater is located in a vehicle fluid circuit. The heater has a heating chamber that holds viscous fluid and a rotor. The rotor rotates to shear the viscous fluid and produce heat. The heat is transmitted to a heat exchange chamber located adjacent to the heating chamber. The rotor rotates at variable rotation velocity, which affects the temperature of the viscous fluid. Circulating fluid in the fluid circuit and is heated in the heat exchange chamber. The heater includes a reservoir chamber communicating with the heating chamber to store viscous fluid. The heater has a valve that selectively connects and disconnects the reservoir chamber with the heating chamber to regulate heat production. The apparatus has a detecting device for detecting a temperature or a speed that is indicative of the temperature of the viscous fluid. The apparatus also has a controller for controlling the valve to reduce heat production when the temperature of the viscous fluid is deemed to be high.

24 Claims, 8 Drawing Sheets

HEATING APPARATUS AND METHOD FOR VEHICLE

BACKGROUND OF THE INVENTION

The present invention relates to a heating apparatus for a vehicle that heats circulating fluid in a fluid circuit and uses the heated circulating fluid for heating the passenger compartment. More particularly, the present invention relates to a vehicle heating apparatus having a viscous fluid type heater and a control unit for controlling the heater.

A typical vehicle includes a heater core located in a heating duct. After cooling a liquid-cooled engine, coolant is supplied to the heater core. The heater core uses heat from the coolant to warm air in the duct. The warmed air is then supplied to the passenger compartment.

However, diesel engines and lean burn type engines have a relatively low heating value and thus are not able to heat engine coolant to a sufficient level. It is therefore difficult to maintain the temperature of the coolant in the heater core at a predetermined temperature (for example, 80° C.). This may result in insufficient heating of the passenger compartment.

In order to solve this problem, a viscous fluid type heater for heating engine coolant has been proposed. The viscous fluid heater includes a heating chamber and a water jacket (a heat exchange chamber), which are defined in a housing. The heater also includes a drive shaft and a rotor, which are rotated by the drive force of an engine. The rotor rotates to shear the viscous fluid (for example, silicone oil having a high viscosity) thereby generating heat based on fluid friction. The heater uses the generated heat to heat circulating fluid (engine coolant).

The temperature of the viscous fluid in the heating chamber increases as the speed of the engine increases and is not significantly affected by the temperature of the circulating fluid in the fluid circuit. If a highly viscous silicone oil is used as the viscous fluid in the heating chamber, the oil is likely to deteriorate from the heat and the friction of the rotor when the temperature of the oil exceeds 250° C. The deteriorated oil degrades the efficiency of heat production by shearing. Therefore, the passenger compartment may be inadequately heated.

SUMMARY OF THE INVENTION

Accordingly, it is an objective of the present invention to provide a vehicle heating apparatus that optimizes the actuation conditions of a viscous fluid type heater for preventing viscous fluid in the heater from deteriorating thereby improving the heat production of the heater.

To achieve the foregoing and other objectives and in accordance with the purpose of the present invention, an improved heating apparatus for a vehicle, which has a fluid circuit, is provided. The apparatus includes a heating chamber, a heat exchange chamber and a rotor. The heating chamber contains viscous fluid. The heat exchange chamber is located adjacent to the heating chamber and communicates with the fluid circuit. The rotor rotates to shear the viscous fluid to produce heat, which is transferred to the exchange chamber. The rotor also rotates at a variable angular velocity that affects the temperature of the viscous fluid. Circulating fluid flowing in the fluid circuit is heated in the heat exchange chamber. The apparatus further includes a reservoir chamber, a valve device, detecting means and a controller. The reservoir chamber communicates with the heating chamber to store a quantity of the viscous fluid. The valve device regulates a flow of viscous fluid between the reservoir chamber and the heating chamber, and regulates the production of heat in the heating chamber accordingly. The detecting means detects a physical characteristic that is indicative of an overheating condition. The controller controls the valve device to reduce heat production in the heating chamber when the detected characteristic fulfills predetermined conditions.

The present invention may also be embodied in a method of heating a vehicle that has a fluid circuit. The method includes storing a quantity of viscous fluid in a reservoir chamber, supplying a heating chamber with viscous fluid from the reservoir chamber and rotating a rotor to shear the viscous fluid to produce heat. The rotor rotates at a variable angular velocity that affects the temperature of the viscous fluid. The method also includes transferring the produced heat to a heat exchange chamber located adjacent to a heating chamber and regulating a flow of viscous fluid between the reservoir chamber and the heating chamber, which regulates the production of heat in the heating chamber accordingly. The heat exchange chamber communicates with the fluid circuit such that circulating fluid flowing in the fluid circuit is heated in the heat exchange chamber. The method further includes detecting a physical characteristic that is indicative of an overheating condition and controlling the valve device to reduce heat production in the heating chamber when the detected characteristic fulfills predetermined conditions under which the viscous fluid is judged to be excessively heated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

A vehicle heating apparatus according to one embodiment of the present invention will now be described with reference to FIGS. 1 to 7.

Figure 1:
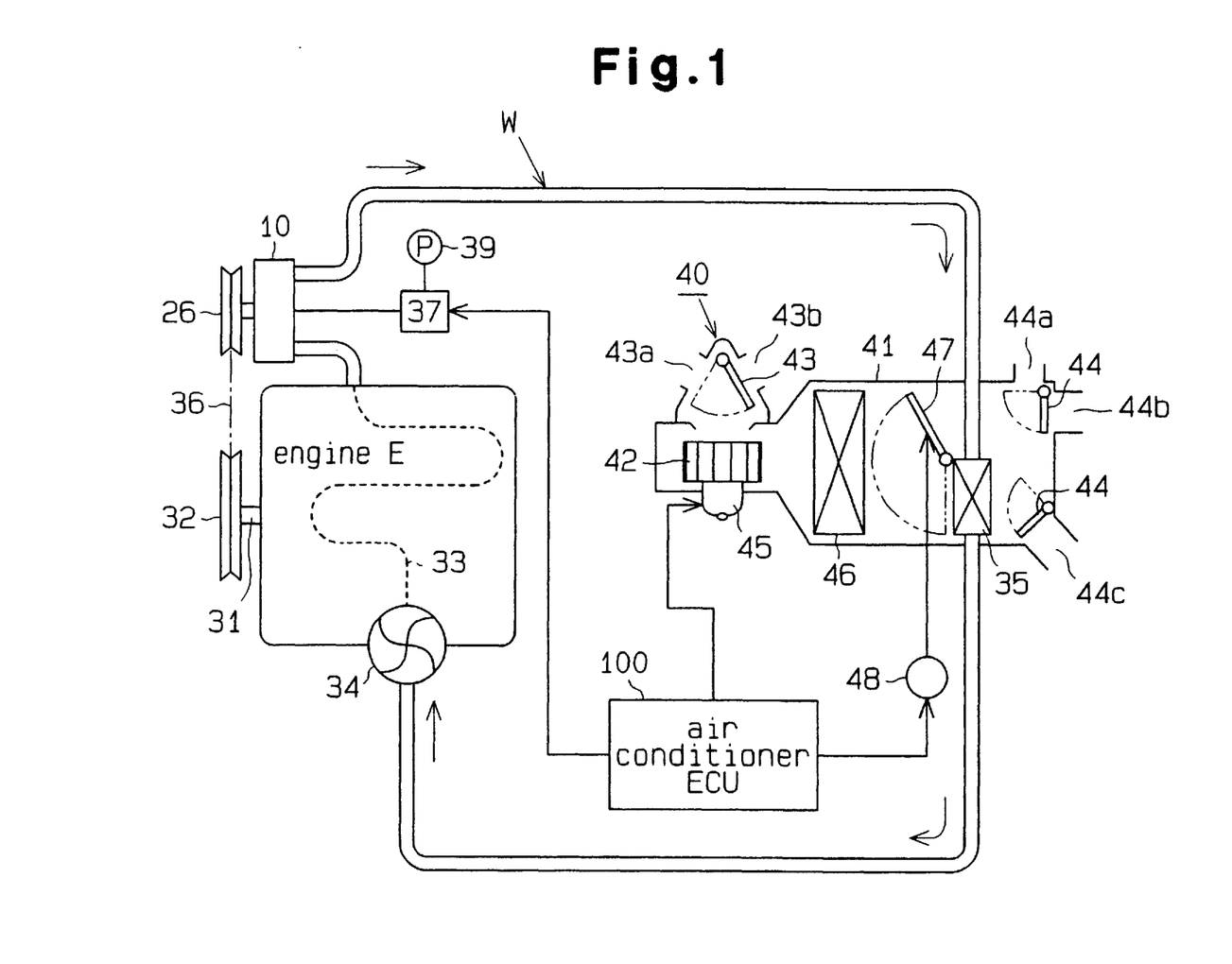
FIG. 1 is a schematic diagram illustrating a vehicle air-conditioning system.
Figure 4:
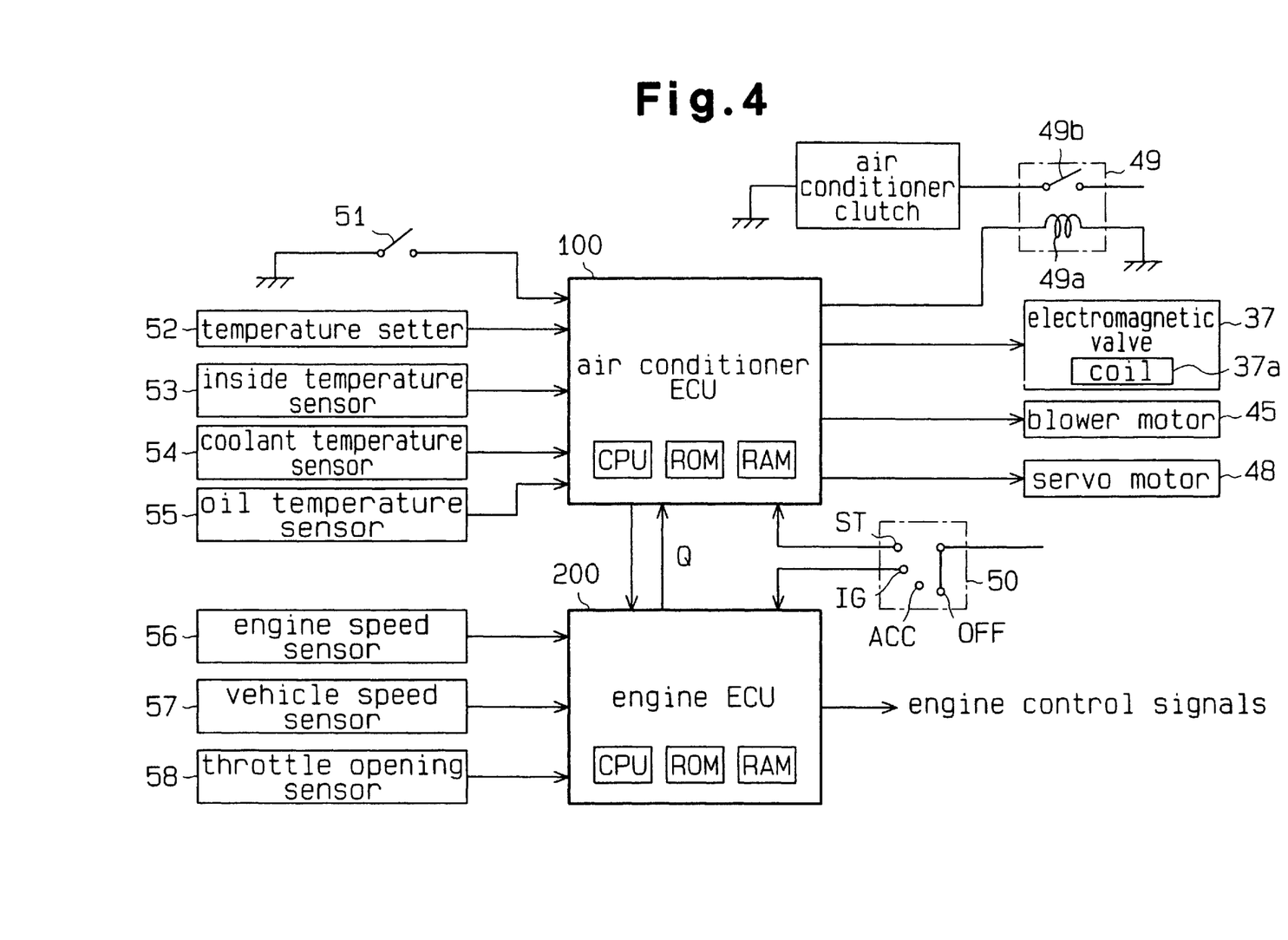
FIG. 4 is a block diagram illustrating the electric structure of a vehicle air conditioning system.

As shown in FIG. 1, an air conditioning system includes a water-cooled engine E located in the engine compartment of a vehicle, a viscous fluid type heater 10 for heating coolant of the engine E, an air conditioner 40 for adjusting the temperature of a passenger compartment and a fluid circuit W for circulating the coolant through the engine E, the heater 10 and the air conditioner 40. As shown in FIG. 4, the air conditioning system also includes an electronic control unit (ECU) 100 that controls the air conditioner 40 and another ECU 200 that chiefly controls the engine E.

A driving pulley 32 is secured to an end of a crankshaft 31 of the engine E. The engine E further includes a water jacket 33 located about its cylinder block and cylinder head. The water jacket 33 constitutes a part of the fluid circuit W. The circuit W also includes a water pump 34 for circulating coolant in the circuit W, a radiator (not shown) for cooling heated coolant by heat exchange between the atmospheric air and the coolant and a heater core 35 for heating air in the passenger compartment. The water pump 34 is located upstream of the water jacket 33 and is driven by the engine E.

The air conditioner 40 includes a duct 41, a blower 42, a refrigeration circuit and the heater core 35. An outside air inlet 43a and an inside air inlet 43b are connected to the upwind side of the duct 41. The duct 41 further includes a selector 43 that selectively closes and opens one of the inlets 43a and 43b. A defroster nozzle 44a, an upper squirt outlet 44b and a lower squirt outlet 44c are connected to the downwind side of the duct 41. The upper squirt outlet 44b supplies air to the upper portion of the passenger compartment and the lower squirt outlet 44c supplies air to the lower portion of the passenger compartment. The duct 41 includes a pair of selectors 44. One of the selectors 44 selectively opens and closes the nozzle 44a and the upper outlet 44b, whereas the other selector 44 selectively opens and closes the lower outlet 44c. The blower 42 is rotated by a blower motor 45 and generates an air stream to the passenger compartment in the duct 41. The refrigeration circuit includes a pipe, which connects to a compressor (not shown), a condenser (not shown), a gas-liquid separator (not shown), an expansion valve (not shown) and an evaporator 46. The evaporator 46 is located in the duct 41 to cool air in the duct 41.

The heater core 35 functions as a heat exchanger for heating the passenger compartment and is located downwind of the evaporator 46 in the duct 41. Also, the heater core 35 is located downstream of the viscous fluid heater 10 in the fluid water circuit W. The heater core 35 transfers heat from the coolant to air that has passed through the evaporator 46 thereby heating the air. An air mixer 47 is located upwind of the heater core 35 in the duct 41. The mixer 47 is actuated by an actuator (in this embodiment, a servo motor 48) through one or more link plates. The mixer 47 adjusts the amount of air passing through the heater core 35 and the amount of air bypassing the heater core 35, thereby adjusting the temperature of the air flowing into the passenger compartment.

Figure 2:
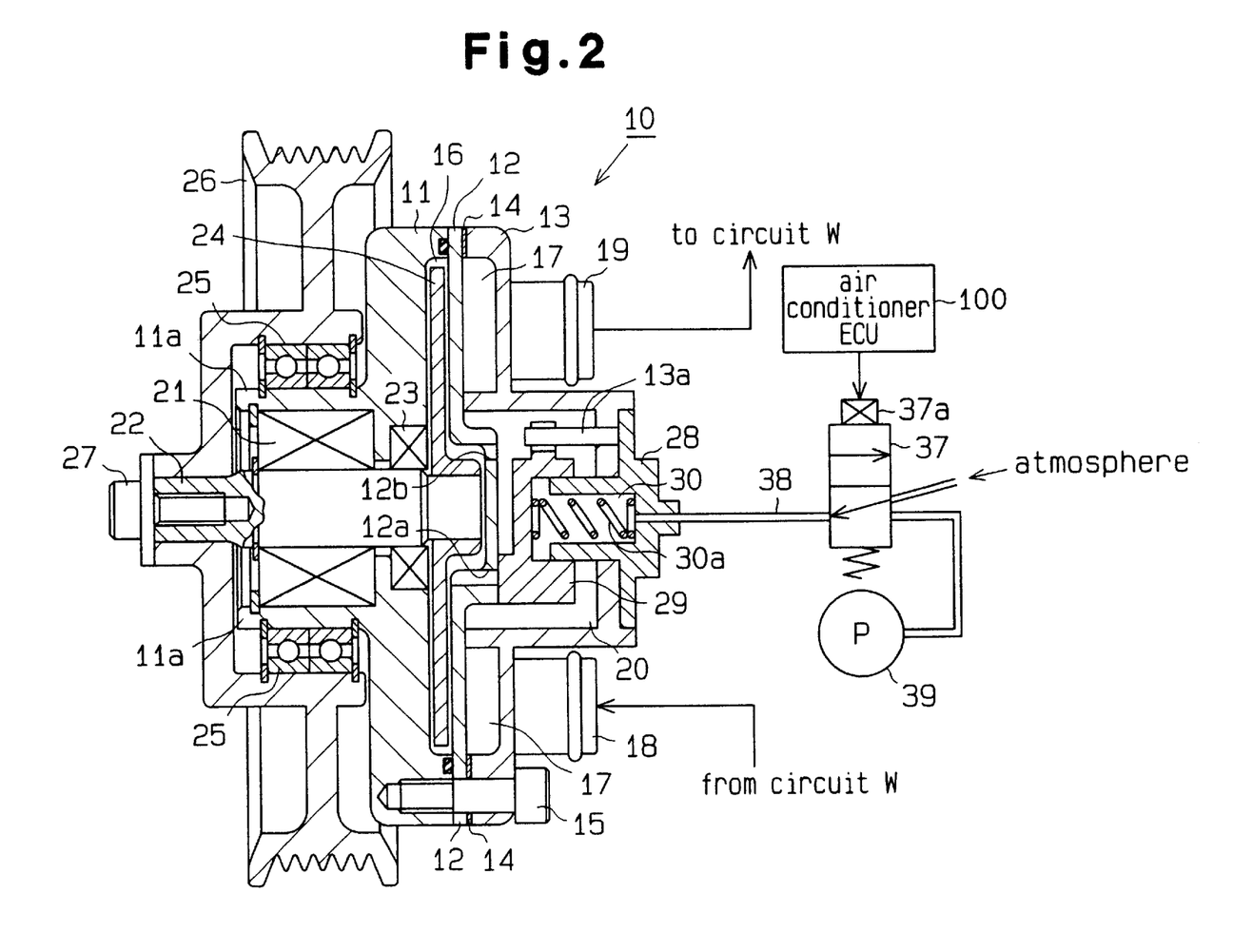
FIG. 2 is a cross-sectional view illustrating a viscous fluid type heater when a communicating passage for connecting a heating chamber with a reservoir chamber is closed.

The construction of the viscous fluid type heater 10 will now be described. As shown in FIG. 2, the viscous fluid type heater 10 includes a front housing body 11, a dividing plate 12 and a rear housing body 13, which are secured to each other by a plurality of bolts 15 (only one is shown). A gasket 14 is located between the dividing plate 12 and the rear housing body 13.

A recess formed in the rear face of the front housing body 11 and the front face of the dividing plate 12 define a heating chamber 16 in between. The rear face of the dividing plate 12 and the rear housing body 13 define a water jacket 17. The water jacket 17 is located adjacent to the heating chamber 16 and functions as a heat exchange chamber. An inlet port 18 and an outlet port 19 are provided on the rear outer face of the rear housing body 13. The inlet port 18 introduces circulating coolant from the fluid circuit W into the water jacket 17, and the outlet port 19 drains coolant from the water jacket 18 to the circuit W.

A drive shaft 22 is rotatably supported by a bearing 21 in the front housing body 11. A shaft seal 23, which is, for example, as an oil seal, is located between the drive shaft 22 and the inner wall of the front housing body 11. The shaft seal 23 seals the front side of the heating chamber 16 and prevents viscous fluid from leaking around the drive shaft 22. A disk-shaped rotor 24 is press fitted about the rear end (right end as viewed in the drawing) of the drive shaft 22 and is located in the heating chamber 16.

A reservoir chamber 20 is defined between the rear housing body 13 and the dividing plate 12. A supply lower bore 12a and a recovery upper bore 12b are formed in the dividing plate 12 for communicating the heating chamber 16 with the reservoir chamber 20. The cross-sectional area of the lower bore 12a is larger than that of the upper bore 12b.

The heating chamber 16 and the reservoir chamber 20, which are connected by the bores 12a and 12b, constitute a sealed inner space in the heater housing. The inner space accommodates silicone oil, which is a viscous fluid. The amount of the silicone oil is determined such that the fill factor of the oil is fifty to eighty percent relative to the volume of the inner space at ordinary temperature. Due to the high viscosity of the silicone oil, the silicone oil is drawn from the reservoir chamber 20 via the lower bore 12a and is evenly distributed in the space between the rotor 24 and the inner wall of the heating chamber 16 by rotation of the rotor 24. The level of the silicone oil is lower than the recovery bore 12b and higher than the supply bore 12a when the rotor 24 is not rotating. Therefore, when the rotor 24 is stopped, the silicone oil in the heating chamber 16 is returned to the reservoir chamber 20 through the recovery bore 12b. In this manner, supplying silicone oil from the reservoir chamber 20 to the heating chamber 16 and recovering the silicone oil from the chamber 16 to the chamber 20 circulates the silicone oil between the chambers 16 and 20.

The front housing body 1 has a cylindrical wall 11a, which protrudes forward. A pulley 26 is rotatably supported on the cylindrical wall 11a by an angular bearing 25. The pulley 26 is fixed to the front end (left end as viewed in the drawing) of the drive shaft 22 and is operably coupled to the driving pulley 32 of the engine E, which functions as an external drive source, by a V-belt 36. The pulley 26, the driving pulley 32 and the V-belt 36 constitute a drive train, which directly connects the drive shaft 22 and the rotor 24 with the engine E. The drive shaft 22 and the rotor 24 are therefore integrally rotated by the drive force of the engine E through the pulley 26. Accordingly, the rotor 24 shears the silicone oil in the space between the outer wall of the rotor 24 and the inner wall of the heating chamber 16, which generates heat. Heat generated in the chamber 16 is transmitted to engine coolant in the water jacket 17, which is included in the fluid circuit W.

A vent cylinder 28 is provided in the rear housing body 13. A spool 29 is slidably supported on a part of the cylinder 28 that is located in the reservoir chamber 20. The back-and-forth motion of the spool 29 brings the lower portion of the spool 29 close to and away from the lower bore 12a. A pin 13a secured to the inner wall of the rear housing body 13 prevents the spool 29 from rotating about the vent cylinder 28. The vent cylinder 28 and the spool 29 define a sealed spring chamber 30 in between. The spring chamber 30 accommodates a spring 30a, which urges the spool 29 toward the dividing plate 12. The spring chamber 30 is connected to a vacuum pump 39 via a pressure regulating pipe 38. An electromagnetic valve 37 is located on the pipe 38 for selectively communicating the spring chamber 30 with the atmosphere and with the vacuum pump 39 in accordance with the state of an electromagnetic coil 37a. The vacuum pump 39 is driven by the engine E. The components 28, 29, 30, 30a, 37, 37a, 38 and 39 constitute a valve device that selectively opens and closes the lower bore 12a.

When the air conditioner ECU 100 sends a signal to the electromagnetic valve 37 for de-exciting the coil 37a, the valve 37 is located at the position shown in FIG. 2 thereby communicating the spring chamber 30 with the atmosphere. This equalizes the pressure in the spring chamber 30 with the atmospheric pressure. The combined force of the atmospheric pressure and the spring 30a causes the spool 29 to contact the dividing plate 12. This closes the lower bore 12a thereby stopping flow of viscous fluid from the reservoir chamber 20 to the heating chamber 16. In this state, viscous fluid in the heating chamber 16 is returned to the reservoir chamber 20 through the upper bore 12b, partly because of the Weissenberg effect. Accordingly, the amount of silicone oil in the heating chamber 16 is decreased. In this manner, the heat production (heating value) of the heater 10 is reduced.

Figure 3:
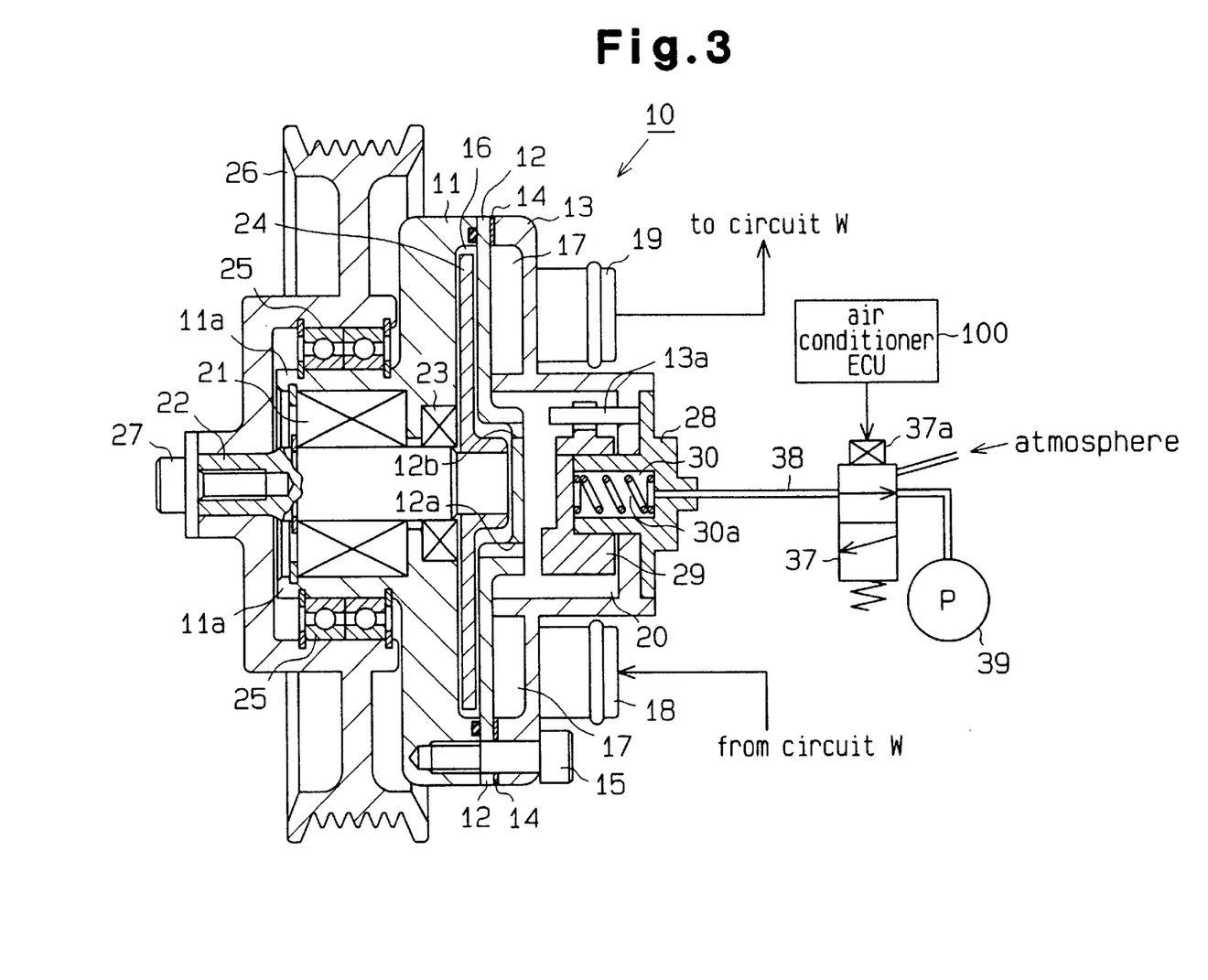
FIG. 3 is a cross-sectional view illustrating the heater of FIG. 2 when the communicating passage is open.

When the air conditioner ECU 100 sends a signal to the electromagnetic valve 37 for exciting the coil 37a, the valve 37 is located at the position shown in FIG. 3 thereby communicating the spring chamber 30 with the vacuum pump 39. The pump 39 draws the air in the spring chamber 30 thereby lowering the pressure in the chamber 30 to a pressure that is lower than the atmospheric pressure. The pressure difference between the reservoir chamber 20 and the spring chamber 30 causes the spool 29 to separate from the dividing plate 12 and to open the lower bore 12a. In this state, viscous fluid in the heating chamber 16 returns to the reservoir chamber 20 via the upper bore 12b. However, the amount of returning oil is smaller than the amount of oil that is supplied to the heating chamber 16 from the reservoir chamber 20 through the lower bore 12a. Therefore, the amount of oil in the heating chamber 16 is increased. In this manner, the heat production (heating value) of the heater 10 is increased.

Figure 6:
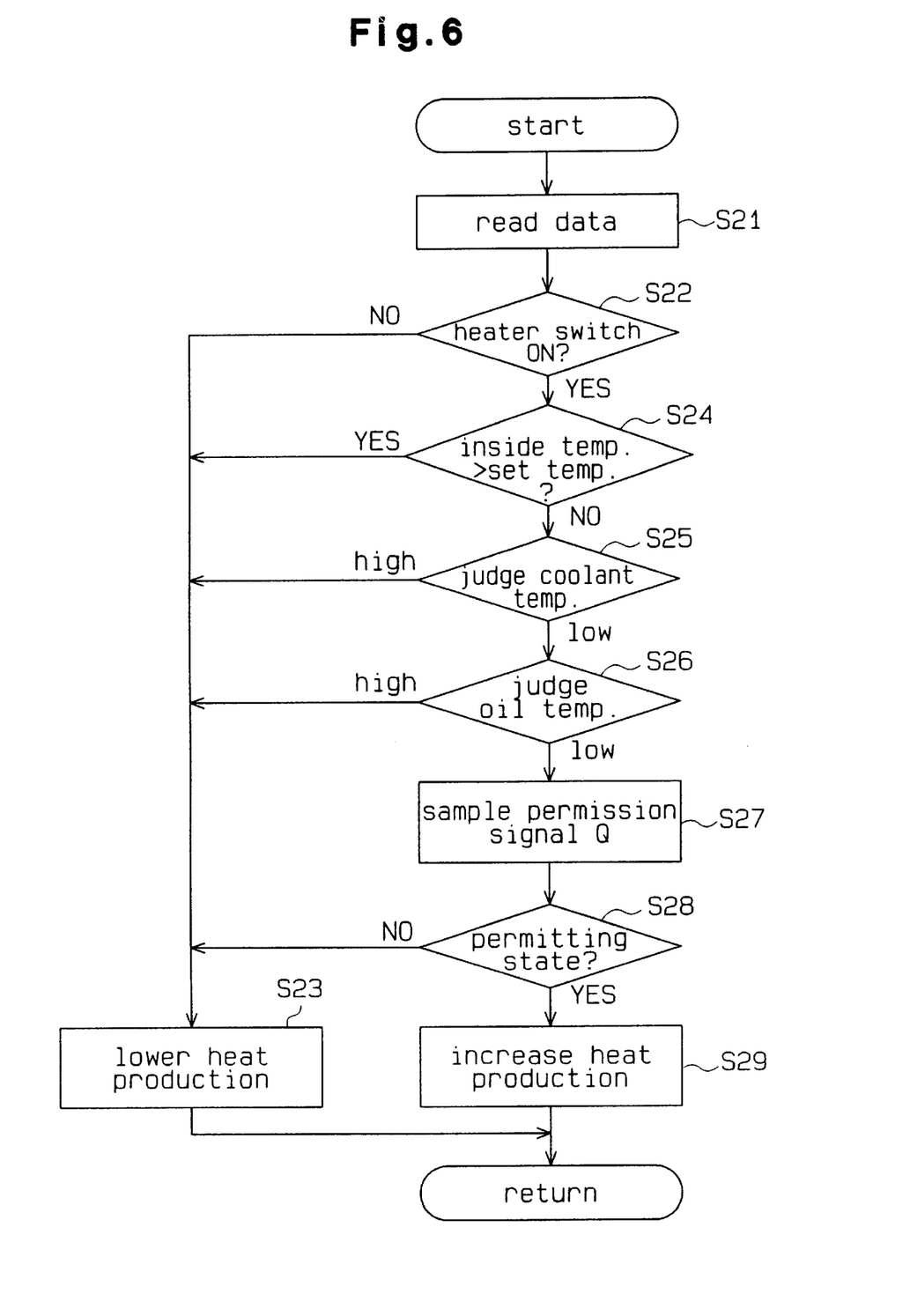
FIG. 6 is a flowchart showing a routine for controlling the heat production of a heater.

FIG. 4 shows the electrical construction of the air conditioning system of FIG. 1. The air conditioner ECU 100 controls devices such as the viscous fluid type heater 10 and the compressor. The ECU 100 is a micro computer incorporating a central processing unit (CPU), a read only memory (ROM), a random access memory (RAM) and input and output interfaces. The ROM stores various control programs (FIG. 6 shows an example) beforehand.

Connected to the ECU 100 are an ignition switch 50, a heater switch 51, a temperature setter 52, an inside temperature sensor 53, a coolant temperature sensor 54, an oil temperature sensor 55 and the engine ECU 200. The ECU 100 inputs various data and signals from these components. The ECU 100 is also connected to the coil 37a of the electromagnetic valve 37, the blower motor 45, the servo motor 48 and an air conditioner clutch relay 49. The ECU 100 controls these components 37a, 45, 48 and 49 based on the control programs referring to the inputted signals and data.

The ignition switch 50 is a main selector switch of the vehicle and has terminals OFF, ACC, IG and ST. The terminal ST feeds current to a starter motor of the engine E. When selected, the terminal ST sends a signal, which indicates actuation of the starter motor, to the air conditioner ECU 100.

The heater switch 51 is a heating priority switch that is actuated by a passenger when he/she wants the passenger compartment to be heated by the viscous fluid type heater 10. When turned on, the switch 51 sends a heating priority signal to the ECU 100. The switch 51 also functions as a fuel economy priority switch, which gives the highest priority to the fuel economy of the engine E. When turned off, the switch 51 sends a fuel economy priority signal to the ECU 100.

The temperature setter 52 is controlled by a passenger for setting a target temperature of the passenger compartment. The setter 52 sends data of the set temperature to the ECU 100 as analog or digital signals.

The inside temperature sensor 53 includes, for example, a thermistor, and is located in the passenger compartment. The sensor 53 detects the temperature of the passenger compartment (inside temperature) and sends analog data corresponding to the detected temperature to the ECU 100.

The coolant temperature sensor 54 includes, for example, a thermistor and is located at any given point in the coolant water circuit. The sensor 54 detects the temperature of the engine coolant circulating in the fluid circuit W (in this embodiment, the temperature of coolant in the vicinity of the outlet port 19 of the heater 10) and sends analog data corresponding to the detected temperature to the ECU 100.

The oil temperature sensor 55 includes, for example, a thermistor and is located in the heating chamber 16 or in the reservoir chamber 20 of the heater 10. The sensor 55 detects the temperature of silicone oil, or viscous fluid, accommodated in the heating chamber 16 and in the reservoir chamber 20 (in this embodiment, the temperature of oil in the reservoir chamber 20) and sends analog data corresponding to the detected temperature to the ECU 100.

The inside temperature sensor 53 may be replaced with a temperature sensor that detects the temperature of the air outside the passenger compartment (outside temperature). The air conditioner clutch relay 49 includes a relay coil 49a and a relay switch 49b. When the relay coil 49a is excited, the relay switch 49b is closed, which excites the coil in the air conditioner clutch.

Figure 5:
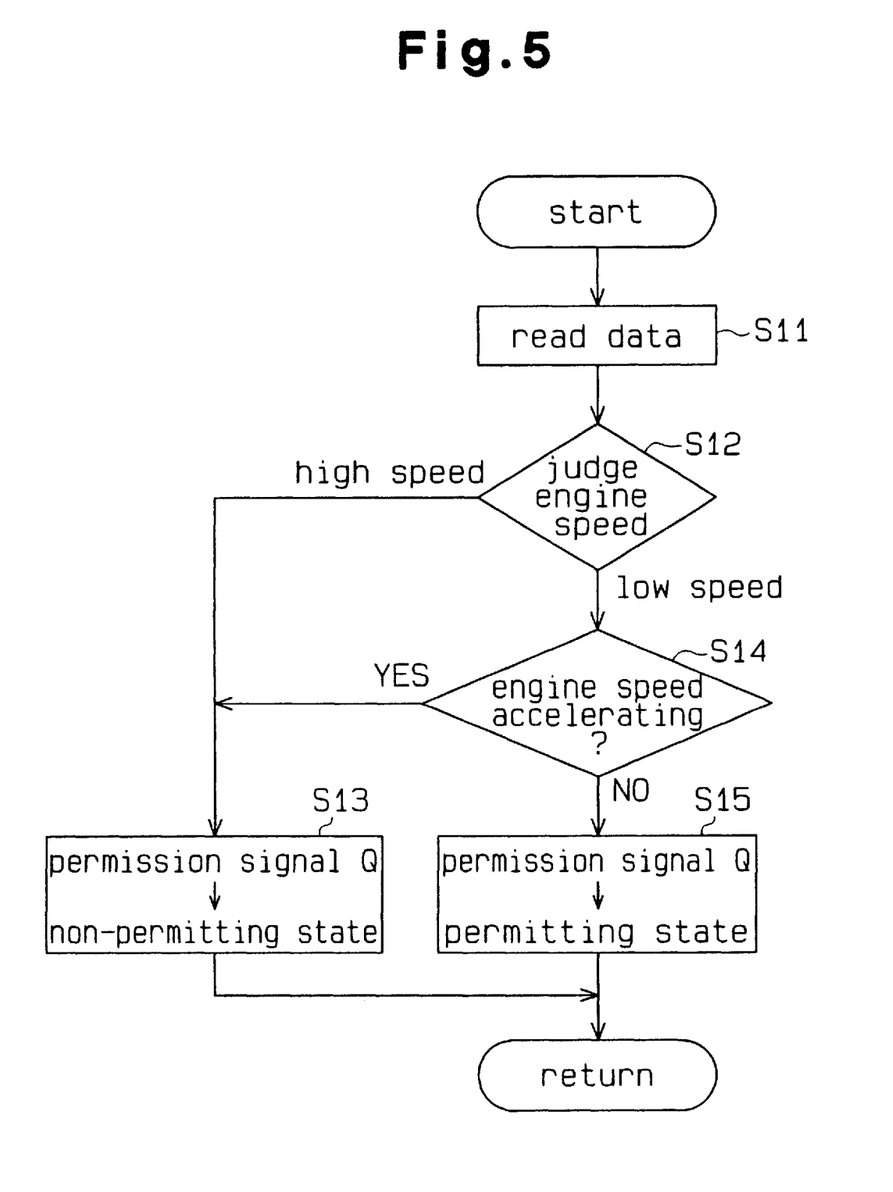
FIG. 5 is a flowchart showing a routing for determining whether to actuate a heater.

The engine ECU 200 is an electronic circuit incorporated in an engine control system that comprehensively controls the engine E. The ECU 200 is a micro computer including a CPU, a ROM, a RAM and input and output interfaces. The ROM stores various predetermined control programs (FIG. 5 shows an example).

The engine ECU 200 is connected to and receives signals and data from an engine speed sensor 56 located in the engine E, a vehicle speed sensor 57, a throttle opening sensor 58 and the air conditioner ECU 100. The ECU 200 refers to the inputted signals and data for controlling the idle speed of the engine E, the amount of fuel injection, the timing of fuel injection, the amount of intake air and the amount of current to a glow plug based on the various control programs. The engine ECU 200 also sends signals (for example, an actuation permission signal Q) to the air conditioner ECU 100.

The engine speed sensor 56 detects the rotational speed of the drive shaft 31 of the engine E, which corresponds to the rotational speed of the rotor 24 in the heater 10. The sensor 56 sends analog or digital data of the detected engine speed to the ECU 200.

The vehicle speed sensor 57 includes, for example, a reed switch type sensor, a photoelectric type vehicle speed sensor or a magnetic reluctance element (MRE) type speed sensor, and is attached to a part of the vehicle. The sensor 57 detects the speed of the vehicle and sends data of the detected vehicle speed to the engine ECU 200.

The throttle opening sensor 58 detects the opening of a throttle valve (not shown) located in the intake pipe of the engine E and sends data of the detected throttle opening to the engine ECU 200.

The engine ECU 200 analyzes the data of the engine speed, the vehicle speed and the throttle opening, which are input from the sensors for computing and judging the acceleration state of the engine E.

FIG. 5 is a flowchart showing a heater actuation determining routine, which is one of the programs executed by the engine ECU 200. The routine is executed at every predetermined crank angle or at interruption requests at every predetermined period of time (for example, 50 millisecond cycle).

When entering this routine, the engine ECU 200 inputs detected data from various sensors at step S11.

Figure 7A:
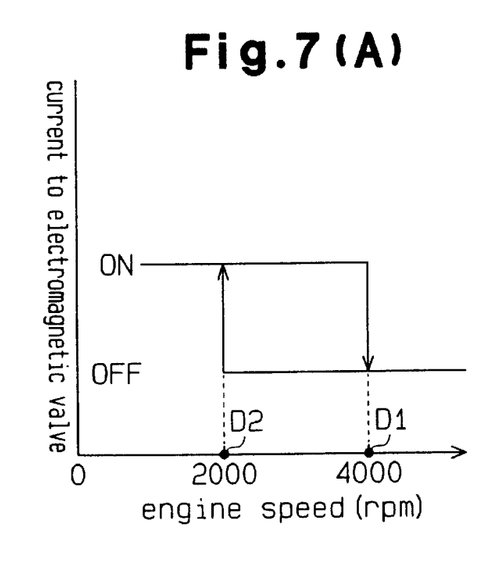
FIG. 7(A) is a graph showing the relationship between current fed to an electromagnetic valve in a heater and the speed of an engine.

The ECU 200 moves to step S12 and judges whether the viscous fluid heater 10 needs to be actuated based on the actual engine speed referring to the graph of FIG. 7(A), which is stored in a memory circuit (for example, the ROM). Specifically, the engine ECU 200 judges whether the engine speed is higher or lower than a predetermined determination engine speed.

In this embodiment, two determination engine speeds D1 and D2 (for example, D1=4000 rpm and D2=2000 rpm) are used in the graph of FIG. 7(A). The speed D1 is greater than the speed D2, and there is a hysteresis curve between the speeds D1 and D2. If current is being supplied to the electromagnetic valve 37, the engine speed is judged to be low as long as the engine speed is lower than the speed D1 and is judged to be high when it exceeds the speed D1. If current is not being supplied to the valve 37, on the other hand, the engine speed is judged to be high as long as it is higher than the speed D2 and is judged to be low when it is lower than the speed D2. When the engine speed is judged to be high, no current is supplied to the valve 37. When the engine speed is judged to be low, current is supplied to the valve 37. In this manner, the actual engine speed is judged to be high or low based on the hysteresis graph of FIG. 7(A). If a single determination speed is used, the current supply to the valve 37 is frequently stopped and started every time the actual engine speed becomes higher or lower than the determination speed. The hysteresis control using the two determination speeds D1 and D2 prevents this frequent switching and thus stabilizes the current supply to the valve 37. However, the valve 37 may be controlled by using a single determination engine speed.

If the actual engine speed is higher than one of the determination speeds (D1 or D2), which is selected based on the graph of FIG. 7(A), the engine ECU 200 moves to step S13. At step S13, the ECU 200 sends an actuation permission signal Q having a non-permitting level (L level) to the air conditioner ECU 100. The signal Q having the non-permitting level causes the air conditioner ECU 100 to lower the heat production of the heater 10.

If the actual engine speed is lower than one of the determination speeds (D1 or D2), which is selected based on the graph of FIG. 7(A), the engine ECU 200 moves to step S14. At step S14, the ECU 200 judges whether the engine speed is accelerating based on throttle opening data input from the throttle opening sensor 58. Specifically, when the throttle opening is greater than a predetermined opening (for example 20%) and the engine speed is increasing, the acceleration state of the engine is judged to be greater to be excessively accelerating.

If than a permitted acceleration and the engine speed is judged

If the engine speed is judged to be accelerating, the engine ECU 200 moves to step S13 for sending an actuation permission signal Q having a non-permitting level (L level) to the air conditioner ECU 100. If the engine speed is not judged to be accelerating, the ECU 200 moves to step S15. At step S15, the ECU 200 sends an actuation permission signal Q having a permitting level (H level) to the ECU 100. The signal Q having the permitting level causes the air conditioner ECU 100 to increase the heat production of the heater 10.

After setting the value of the actuation permission signal Q at step S13 or at step S15, the engine ECU 200 terminates the process of the heater actuation determining routine.

FIG. 6 is a flowchart showing a heat production control routine, which is one of the programs executed by the air conditioner ECU 100. The routine is executed at every predetermined crank angle or at interruption requests at every predetermined period of time (for example, every 50 millisecond).

When the ECU 100 starts this routine, the ECU 100 reads detected data from various sensors at step S21 and moves to step S22. At step S22, the ECU 100 judges whether the heater switch 51 is on, that is, the ECU 100 judges which of a heating priority signal or a fuel economy priority signal is being inputted to the ECU 100.

If the determination of step S22 is negative, that is, if the heater switch 51 is off, the CPU 100 judges that heating of the passenger compartment is not desired and moves to step S23. At step S23, the ECU 100 stops feeding current to the coil 37a of the electromagnetic valve 37 thereby causing the spool 29 to close the lower bore 12a. This stops flow of viscous fluid from the reservoir chamber 20 to the heating chamber 16 and thus lowers the heat production of the heater 10.

If the determination is positive at step S22, that is, if the heater switch 51 is on, the ECU 100 judges that a passenger wishes to warm the passenger compartment and moves to step S24. At step S24, the ECU 100 judges whether the temperature detected by the inside temperature sensor 53 is higher than the temperature set by the temperature setter 52.

If the determination of step S24 is positive, the ECU 100 judges that heating of the passenger compartment is not necessary and moves to step S23. At step S23, the ECU 100 stops feeding current to the coil 37a of the valve 37 thereby lowering the heat production of the heater 10.

If the determination of step S24 is negative, the ECU 100 moves to step S25. At step S25, the ECU 100 judges whether the viscous fluid heater 10 needs to be actuated based on the actual temperature of the engine coolant referring to the graph of FIG. 7(B), which is stored in a memory circuit (for example, the ROM). Specifically, the ECU 100 judges whether the coolant temperature is higher or lower than a predetermined coolant temperature.

Figure 7B:
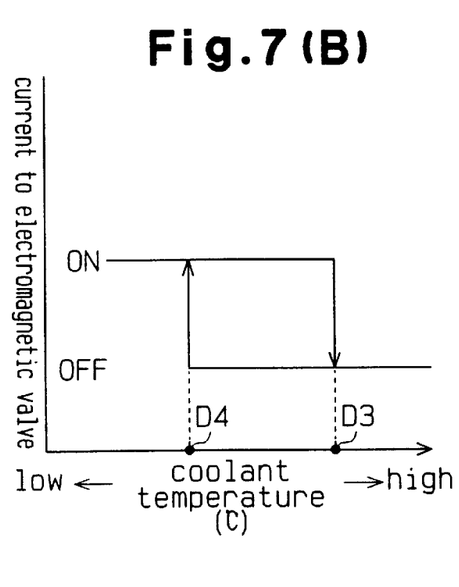
FIG. 7(B) is a graph showing the relationship between current fed to an electromagnetic valve in a heater and the temperature of engine coolant.

In this embodiment, two determination coolant temperatures D3 and D4 (for example, D3=80° C. and D4=70° C.) are used in the graph of FIG. 7(B). The temperature D3 is higher than the temperature D4 and there is a hysteresis curve between the temperatures D3 and D4. If current is being supplied to the electromagnetic valve 37, the coolant temperature is judged to be low as long as the coolant temperature is lower than the temperature D3 and is judged to be high when it exceeds the temperature D3. If current is not being supplied to the valve 37, the coolant temperature is judged to be high as long as it is higher than temperature D4 and is judged to be low when it is lower than the temperature D4. When the coolant temperature is judged to be high, no current is supplied to the valve 37. When the coolant temperature is judged to be low, current is supplied to the valve 37. In this manner, the actual coolant temperature is judged to be high or low based on the hysteresis graph of FIG. 7(B). If a single determination temperature is used, the current supply to the valve 37 is frequently stopped and started every time the actual coolant temperature becomes higher or lower than the determination temperature. The hysteresis control using the two determination temperatures D3 and D4 prevents this frequent switching and thus stabilizes the current supply to the valve 37. However, the valve 37 may be controlled by using a single determination coolant temperature.

If the coolant temperature is judged to be high at step S25, the ECU 100 moves to step S23 and stops feeding current to the coil 37a of the valve 37 thereby lowering the heat production of the heater 10.

If the coolant temperature is judged to be low at step S25, the ECU 100 moves to step S26. At step S26, the ECU 100 judges whether the viscous fluid heater 10 needs to be actuated based on the actual temperature of the silicone oil referring to the graph of FIG. 7(C), which is stored in a memory circuit (for example, the ROM). Specifically, the ECU 100 judges whether the oil temperature is higher or lower than a predetermined oil temperature.

Figure 7C:
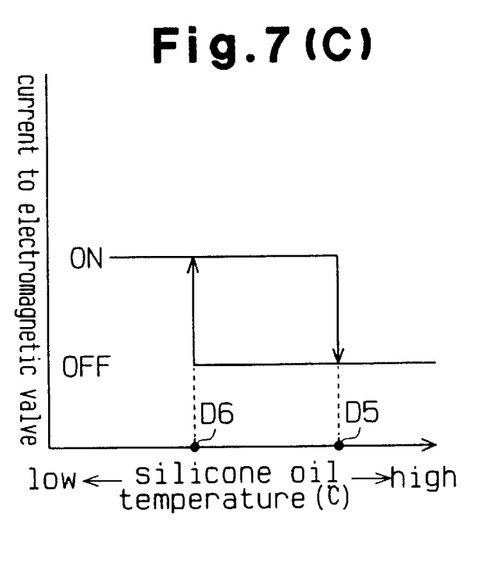
FIG. 7(C) is a graph showing the relationship between current fed to an electromagnetic valve in a heater and the temperature of silicone oil in the heater.

In this embodiment, two determination oil temperatures D5 and D6 (for example, D5=280° C. and D6=270° C.) are used in the graph of FIG. 7(C). The temperature D5 is higher than the temperature D6 and there is a hysteresis curve between the temperatures D5 and D6. If current is being supplied to the electromagnetic valve 37, the oil temperature is judged to be low as long as the oil temperature is lower than the temperature D5 and is judged to be high when it exceeds the temperature D5. If current is not being supplied to the valve 37, the oil temperature is judged to be high as long as it is higher than temperature D6 and is judged to be low when it is lower than the temperature D6. When the oil temperature is judged to be high, no current is supplied to the valve 37. When the oil temperature is judged to be low, current is supplied to the valve 37. In this manner, the actual oil temperature is judged to be high or low based on the hysteresis graph of FIG. 7(C). If a single determination temperature is used, the current supply to the valve 37 is frequently stopped and started every time the actual oil temperature becomes higher or lower than the determination temperature. The hysteresis control using the two determination temperatures D5 and D6 prevents this frequent switching and thus stabilizes the current supply to the valve 37. However, the valve 37 may be controlled by using a single determination oil temperature.

If the oil temperature is judged to be high at step S26, the ECU 100 moves to step S23 and stops feeding current to the coil 37a of the valve 37 thereby lowering the heat production of the heater 10.

If the oil temperature is judged to be low at step S26, the ECU 100 moves to step S27. At step S27, the air conditioner ECU 100 performs sampling of an actuation permission signal Q sent from the engine ECU 200 and moves to step S28. At step S28, the ECU 100 judges whether the signal Q has a permitting level (H level).

If the determination of step S28 is negative, the ECU 100 moves to step S23 and stops feeding current to the coil 37a of the valve 37 thereby lowering the heat production of the heater 10. If the determination of step S28 is positive, the ECU 100 moves to step S29. At step S29, the ECU 100 feeds current to the coil 37a of the valve 37 thereby moving the spool 29 backward. This opens the lower bore 12a and causes viscous fluid in the reservoir chamber 20 to flow into the heating chamber 16. As result, the heat production of the heater 10 is increased.

The above embodiment has the following advantages.

(A) When the heater 10 satisfies all the conditions (S22, S24, S25, S26 and S28) for increasing its heat production, the electromagnetic valve 37 is controlled such that the lower bore 12a is opened. This allows viscous fluid in the reservoir chamber 20 to flow into the heating chamber 16. In this manner, the heat production of the heater 10 is increased when it is appropriate. Accordingly, the circulating fluid (the engine coolant) is heated and the temperature of the coolant is maintained at a predetermined temperature (for example, 80° C.).

(B) When any one of the conditions for enhancing the heat production of the heater 10 is not satisfied, the electromagnetic valve 37 is controlled such that the spool 29 closes the lower bore 12a. This prohibits the viscous fluid in the reservoir chamber 20 to flow into the heating chamber 16. At this time, the upper bore 12b is open and viscous fluid in the heating chamber 16 is returned to the reservoir chamber 20 through the bore 12b. As long as the lower bore 12a is closed, the amount of the viscous fluid in the heating chamber 16 is gradually decreased. Accordingly, the heat production of the heater 10 is reduced. This prevents the viscous fluid from retaining heat. The temperature of the viscous fluid is thus not excessively increased. Accordingly, the heater 10 resists deterioration of the viscous fluid by heat. The low amount of viscous fluid in the heating chamber 16 also prevents the viscous fluid from being deteriorated by friction between the rotor 24 and the fluid.

(C) When the amount of viscous fluid in the heating chamber 16 is decreased for reducing the heat production of the heater 10, shearing resistance of the viscous fluid, which acts on the rotor 24, is lowered. This reduces the load on the engine E for rotating the drive shaft 22 and the rotor 24. This improves the fuel economy of the engine E.

(D) As shown in FIGS. 7(A), 7(B) and 7(C), three pairs of different determination values are used. This prevents the heater 10 from being frequently turned on and off thereby reducing the number of abrupt changes in the torque acting on the engine E.

It should be apparent to those skilled in the art that the present invention may be embodied in many other specific forms without departing from the spirit or scope of the invention. Particularly, it should be understood that the invention may be embodied in the following forms.

Figure 8:
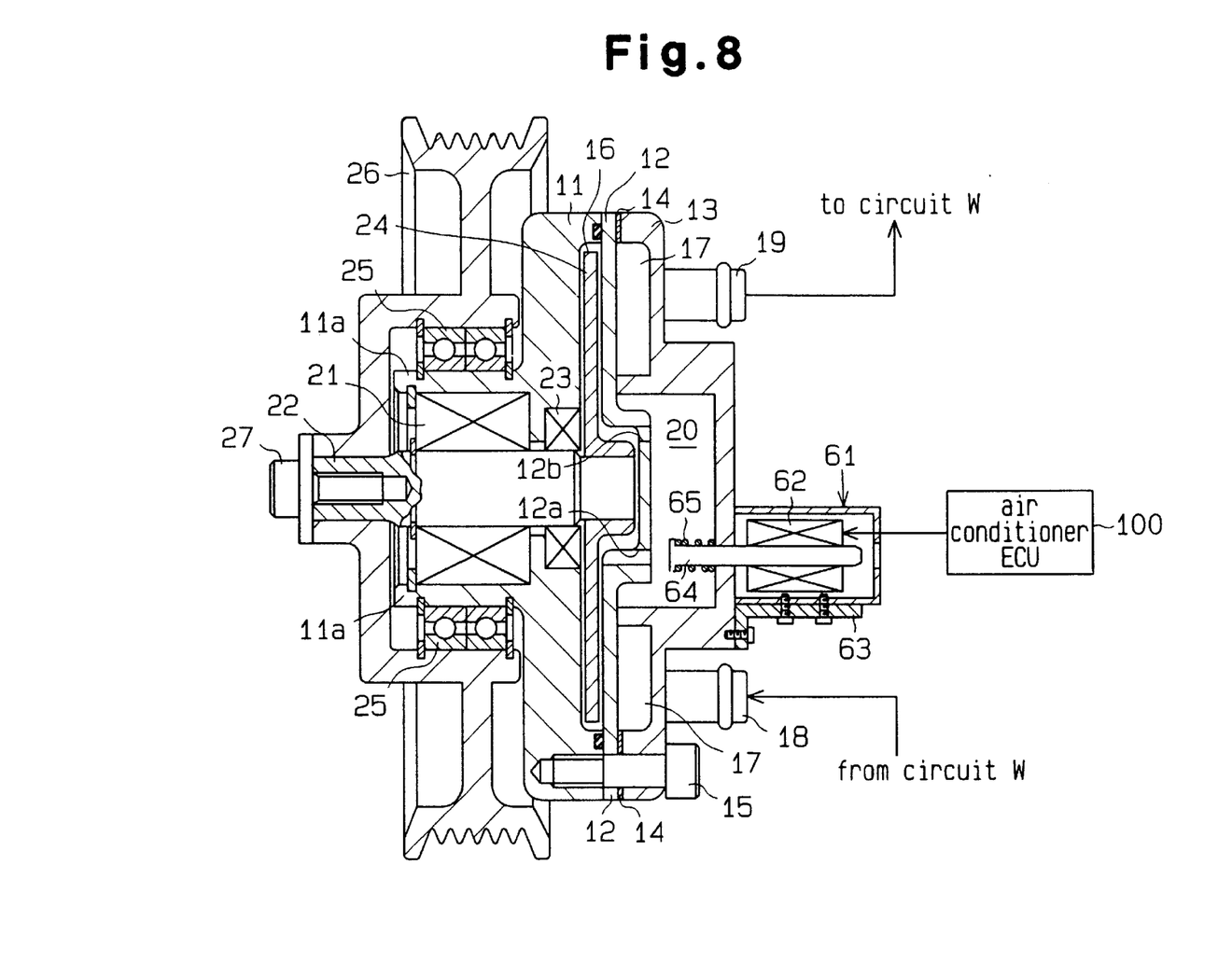
FIG. 8 is a cross-sectional view illustrating a further embodiment, in which a valve for closing the communicating passage is modified.

(1) Instead of the spool 29 and the electromagnetic valve 37 shown in FIGS. 2 and 3, an electromagnetic solenoid 61 as illustrated in FIG. 8 may be used as a valve device for closing the lower bore 12a. As shown in FIG. 8, a solenoid coil 62 is provided on the back face of the rear housing body 13 and is supported by a plate 63. A rod 64 is located in the central portion of the coil 62. The rod 64 slides with respect to the rear housing body 13. In this case, the distal end of the rod 64 is located in the reservoir chamber 20 and faces the lower bore 12a. Further, the area of the distal end face of the rod 64 is greater than the area of the lower bore 12a so that the rod 64 closes the bore 12a when contacting the dividing plate 12. A coil spring 65 is located between the distal end of the rod 64 and the inner wall of the reservoir chamber 20 for urging the rod 64 toward the plate 12.

When the air conditioner ECU 100 starts feeding current to the solenoid coil 62, electromagnetic force produced in the solenoid coil 62 moves the rod 64 backward thereby opening the lower bore 12a. On the other hand, when the ECU 100 stops feeding current to the solenoid 62, the urging force of the spring 65 causes the distal end face of the rod 64 to contact the plate 12 thereby closing the bore 12a. This construction of the solenoid 61 and the spring 65 simplifies the valve device for closing the lower bore 12a.

(2) The viscous fluid type heaters illustrated in FIGS. 2 and 8 only have the valve device for closing the lower bore 12a. However, a similar device may be provided for closing the upper bore 12b. This construction allows the circulation of the viscous fluid to be more subtly controlled.

(3) Instead of the engine speed sensor 65, which detects the rotational speed of the drive shaft 31 of the engine E, a sensor that detects the rotational speed of the drive shaft 22 or the rotor 24 of the heater 10 may be used.

(4) In the electric construction shown in FIG. 4, the air conditioner ECU 100 is constructed independently from the engine ECU 200. The engine ECU 200 judges the engine speed and the acceleration state of the engine E and sends the resultant data to the ECU 100 as an actuation permission signal Q. However, the ECUs 100 and 200 may be integrated. In this case, the integrated unit controls the heat production of the heater 10. Although an increased number of ports of input and output interfaces and prolonged time period between each interruption process are required, the construction of the integrated control unit reduces its manufacturing cost.

The term "viscous fluid" in this specification refers to any type of medium that generates heat based on fluid friction when sheared by a rotor. The term is therefore not limited to highly viscous fluid or semi-fluid material, much less to silicone oil.

Therefore, the present examples and embodiments are to be considered as illustrative and not restrictive and the invention is not to be limited to the details given herein, but may be modified within the scope and equivalence of the appended claims.

What is claimed is:

1. A heating apparatus for a vehicle, wherein the vehicle has a fluid circuit, the apparatus comprising:

a heating chamber containing viscous fluid;

a heat exchange chamber located adjacent to the heating chamber, wherein the heat exchange chamber communicates with the fluid circuit;

a rotor that rotates to shear the viscous fluid to produce heat, which is transferred to the exchange chamber, wherein the rotor rotates at a variable angular velocity that affects the temperature of the viscous fluid, and wherein circulating fluid flowing in the fluid circuit is heated in the heat exchange chamber;

a reservoir chamber communicating with the heating chamber to store a quantity of the viscous fluid;

a valve device for regulating a flow of viscous fluid between the reservoir chamber and the heating chamber, which regulates the production of heat in the heating chamber accordingly;

detecting means for detecting a physical characteristic that is indicative of an overheating condition; and a controller for controlling the valve device to reduce heat production in the heating chamber when the detected characteristic fulfills predetermined conditions.

2. The apparatus as set forth in claim 1, further comprising a passage connecting the heating chamber with the reservoir chamber, wherein the valve device selectively opens and closes the passage.

3. The apparatus as set forth in claim 2, wherein the passage includes a first opening that opens to the heating chamber and a second opening that opens to the reservoir chamber, and wherein the valve device includes a movable member located in the reservoir chamber to selectively open and close the second opening.

4. The apparatus as set forth in claim 3, wherein the valve device includes:

a spool forming the movable member;

a spring for biasing the spool toward the second opening;

a negative pressure pump for biasing the spool away from the second opening against force of the spring; and a negative pressure chamber selectively connected to and disconnected with the negative pressure pump, wherein negative pressure acts on the spool when the negative pressure chamber is connected to the negative pressure pump.

5. The apparatus as set forth in claim 4, wherein the valve device further includes an electromagnetic valve located between the negative pressure chamber and the negative pressure pump to selectively connect and disconnect the negative pressure chamber with the negative pressure pump according to a signal from the controller.

6. The apparatus as set forth in claim 3, wherein the valve device includes:

a rod forming the movable member;

a spring for biasing the rod toward the second opening;

an electromagnetic solenoid for biasing the rod away from the second opening against force of the spring according to a signal from the controller.

7. The apparatus according to claim 1, wherein the vehicle is powered by a liquid-cooled engine, and wherein the engine drives the rotor, and wherein the engine is cooled by the fluid in the fluid circuit, and further wherein at least one passage connects the reservoir chamber and the heating chamber so that viscous fluid can flow between the reservoir chamber and the heating chamber, wherein the valve device regulates the flow of viscous fluid in the passage.

8. The apparatus as set forth in claim 7, wherein the detecting means includes a sensor for detecting the speed of the engine, and wherein the controller controls the valve device to close the passage when the detected engine speed is greater than a predetermined level.

9. The apparatus as set forth in claim 7, wherein the detecting means includes a sensor for sensing a physical characteristic that is indicative of acceleration of the engine, and wherein the controller controls the valve device to close the passage when the detected characteristic is greater than a predetermined level.

10. The apparatus as set forth in claim 7, further comprising:

means for presetting a desired temperature in a passenger compartment of the vehicle; and a first temperature sensor for detecting the actual temperature in the passenger compartment, wherein the controller controls the valve device to close the passage when the actual temperature is higher than the desired temperature.

11. The apparatus as set forth in claim 10, further comprising a second temperature sensor for detecting the temperature of the circulating coolant, wherein the controller controls the valve device to close the passage when the temperature of the circulating fluid is higher than a first predetermined level.

12. The apparatus as set forth in claim 11, further comprising a third temperature sensor for detecting the temperature of the viscous fluid, wherein the controller is arranged to control the valve device to close the passage when the temperature of the viscous fluid is higher than a second predetermined level.

13. The apparatus as set forth in claim 7, wherein the passage includes a first opening that opens to the heating chamber and a second opening that opens to the reservoir chamber, and wherein the valve device includes a movable member located in the reservoir chamber to selectively open and close the second opening of the passage.

14. A heating apparatus according to claim 7, wherein the passage is a first passage, and wherein the reservoir chamber is additionally connected to the heating chamber by a second passage, wherein the first passage allows viscous fluid to flow from the reservoir chamber to the heating chamber, and wherein the second passage allows flow of viscous fluid from the heating chamber to the reservoir chamber, and wherein the valve device regulates flow of viscous fluid in the first passage.

15. The apparatus according to claim 14, wherein the first passage has a cross sectional area that is greater than that of the second passage.

16. A viscous fluid type heater comprising:

a heating chamber that accommodates viscous fluid;

a heat exchange chamber located adjacent to the heating chamber, wherein the heat exchange chamber communicates with an external fluid circuit;

a rotor for shearing the viscous fluid so that heat is produced in the heating chamber, wherein the heat is transferred to the heat exchange chamber, wherein fluid circulating in the fluid circuit is heated in the heat exchange chamber;

a reservoir chamber for storing a quantity of the viscous fluid;

a first passage for connecting the heating chamber to the reservoir chamber, the first passage allowing viscous fluid to flow to the heating chamber from the reservoir chamber;

a second passage for connecting the heating chamber to the reservoir chamber, the second passage allowing viscous fluid to flow to the reservoir chamber from the heating chamber; and a valve device for restricting the first passage when the rotor rotates at speed higher than a predetermined magnitude.

17. The heater as set forth in claim 16, wherein the first passage and the second passage are respectively located below and above the upper level of the viscous fluid when the viscous fluid is at rest.

18. The apparatus as set forth in claim 17, wherein the first passage has an cross sectional area greater than that of the second passage.

19. A method of heating a vehicle wherein the vehicle has a fluid circuit, the method comprising:

storing a quantity of viscous fluid in a reservoir chamber;

supplying a heating chamber with viscous fluid from the reservoir chamber;

rotating a rotor to shear the viscous fluid to produce heat, wherein the rotor rotates at a variable angular velocity that affects the temperature of the viscous fluid;

transferring the produced heat to a heat exchange chamber located adjacent to a heating chamber, wherein the heat exchange chamber communicates with the fluid circuit such that circulating fluid flowing in the fluid circuit is heated in the heat exchange chamber;

regulating a flow of viscous fluid between the reservoir chamber and the heating chamber, which regulates the production of heat in the heating chamber accordingly;

detecting a physical characteristic that is indicative of an overheating condition; and controlling the valve device to reduce heat production in the heating chamber when the detected characteristic fulfills predetermined conditions under which the viscous fluid is judged to be excessively heated.

20. The method according to claim 19, wherein the step of detecting a physical characteristic includes detecting the speed of a rotating member, wherein the speed of the rotating member is indicative of the speed of the rotor.

21. The method according to claim 20, wherein the step of detecting a rotating member includes the step of detecting the rotating speed of an engine to which the fluid circuit is connected.

22. The method according to claim 19, wherein the step of detecting a physical characteristic includes detecting the temperature of the viscous fluid.

23. The method according to claim 19, wherein the step of detecting a physical characteristic includes detecting the temperature of the fluid in the fluid circuit.

24. The method according to claim 19, wherein the step of detecting a physical characteristic includes detecting the temperature of a passenger compartment of a vehicle to which the fluid circuit is connected.

* * * * *

UNITED STATES PATENT AND TRADEMARK OFFICE
CERTIFICATE OF CORRECTION

PATENT NO. : 5,829,676

DATED : November 3, 1998

INVENTOR(S) :
Takashi, BAN, Shigeru SUZUKI, and Nobuaki HOSHINO

It is certified that error appears in the above-identified patent and that said Letters Patent is hereby corrected as shown below:

In column 8, line 6: after the words "to be greater", insert -- than a permitted acceleration and the engine speed is judged --;

In column 8, lines 8 and 9: delete "If than a permitted acceleration and the engine speed is judged";

Signed and Sealed this

Sixth Day of July, 1999

Attest:

Q. TODD DICKINSON

Attesting Officer

Acting Commissioner of Patents and Trademarks